United States Patent

Proulx et al.

(10) Patent No.: US 10,061,914 B2
(45) Date of Patent: Aug. 28, 2018

(54) ACCOUNT RECOVERY PROTOCOL

(71) Applicant: McAfee, Inc., Santa Clara, CA (US)

(72) Inventors: François Proulx, Verdun (CA);
Richard Reiner, Santa Clara, CA (US);
Mathieu René, Montreal (CA);
Gregory Whiteside, Montreal (CA)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/928,443

(22) Filed: Oct. 30, 2015

(65) Prior Publication Data

US 2016/0140335 A1   May 19, 2016

Related U.S. Application Data

(60) Provisional application No. 62/080,125, filed on Nov. 14, 2014.

(51) Int. Cl.
G06F 21/45 (2013.01)
G06F 21/34 (2013.01)
(Continued)

(52) U.S. Cl.
CPC ............ G06F 21/45 (2013.01); H04L 9/0863 (2013.01); H04L 9/0891 (2013.01);
(Continued)

(58) Field of Classification Search
CPC .......... G06F 21/34; G06F 21/36; G06F 21/45; G06F 2221/31; G06F 2221/33;
(Continued)

(56) References Cited

U.S. PATENT DOCUMENTS 5,937,066 A    8/1999  Gennaro et al.
7,383,570 B2*  6/2008  Pinkas ................... G06F 21/34
                                                      726/1

(Continued)

FOREIGN PATENT DOCUMENTS

| GB | 2513260 | 10/2014 |
| JP | H10126404 | 5/1998 |
| JP | 2005100255 | 4/2005 |

OTHER PUBLICATIONS

Pavan Sugarana. "Password Recovery with CAPTCHA" Published Nov. 6, 2012 (6 pages) http://www.dotnetfunda.com/articles/show/2019/passwordrecovery-with-captcha.*

(Continued)

Primary Examiner — Joseph P Hirl
Assistant Examiner — Thomas Gyorfi
(74) Attorney, Agent, or Firm — Hanley, Flight & Zimmerman, LLC

(57) ABSTRACT

The present disclosure relates to receiving a request for recovery of an account associated with a user, sending a CAPTCHA challenge to a user device associated with the user, receiving an answer to the CAPTCHA challenge and a confirmation code wrapped by an encryption key derived from a provisional master password, sending a notification of the request for recovery to one or more trusted entities associated with the user, and receiving a confirmation of the request from one or more of the trusted entities. The confirmation includes a recovery token associated with the particular trusted entity and an encrypted confirmation code.

10 Claims, 10 Drawing Sheets

(51) Int. Cl.
*G06F 21/36* (2013.01)
*H04L 9/08* (2006.01)
*H04L 9/32* (2006.01)

(52) U.S. Cl.
CPC .......... *H04L 9/0894* (2013.01); *H04L 9/3226* (2013.01); *G06F 2221/2131* (2013.01); *G06F 2221/2133* (2013.01)

(58) Field of Classification Search
CPC ... H04L 9/0863; H04L 9/0891; H04L 9/0894; H04L 9/3226
See application file for complete search history.

(56) References Cited

U.S. PATENT DOCUMENTS

| | | | | |
|---|---|---|---|---|
| 8,955,065 | B2* | 2/2015 | Hitchcock | G06F 21/00 726/5 |
| 9,037,864 | B1* | 5/2015 | Staddon | G06F 21/32 713/182 |
| 9,348,981 | B1* | 5/2016 | Hearn | G06F 21/31 |
| 2010/0161927 | A1 | 6/2010 | Sprouse et al. | |
| 2010/0250955 | A1* | 9/2010 | Trevithick | G06F 21/31 713/185 |
| 2010/0293600 | A1 | 11/2010 | Schechter et al. | |
| 2012/0174203 | A1* | 7/2012 | Frank | G06F 21/31 726/7 |
| 2013/0198824 | A1 | 1/2013 | Hitchcock et al. | |
| 2013/0042311 | A1 | 2/2013 | Broder et al. | |
| 2013/0097697 | A1 | 4/2013 | Zhu et al. | |
| 2013/0276125 | A1* | 10/2013 | Bailey | H04L 63/1433 726/25 |
| 2014/0245005 | A1 | 8/2014 | Dottax et al. | |
| 2014/0359653 | A1* | 12/2014 | Thorpe | G06F 21/00 725/30 |
| 2015/0242616 | A1* | 8/2015 | Oprea | G06F 21/445 726/1 |

OTHER PUBLICATIONS

"Django—Adding CAPTCHA validation to your forms" Published Mar. 2, 2012 (3 pages) https://tryolabs.com/blog/2012/03/02/django-adding-captcha-validation-forms/.*

H. Krawczyk et al. "RFC 2104: HMAC: Keyed-Hashing for Message Authentication" Published Feb. 1997 (11 pages) https://tools.ietf.org/pdf/rfc2104.pdf.*

International Search Report and Written Opinion received in corresponding application No. PCT/US2015/059060, dated Feb. 19, 2016.

European Patent Office, "Extended European Search Report," issued in connection with European application No. 15859609.8, dated May 15, 2018, 11 pages.

Japan Patent Office, "Notification of Reasons for Refusal," issued in connection with Japanese Patent Application No. 2017-544834, dated Jun. 28, 2018, 5 pages.

* cited by examiner

ACCOUNT RECOVERY PROTOCOL

TECHNICAL FIELD

This application relates to the field of computing, and more particularly to a system, method, and protocol for user account recovery.

BACKGROUND

With the proliferation of services and applications available to users, it often becomes necessary for a particular user to remember login credentials, such as passwords, for a multitude of service and/or application accounts associated with the user. If the user forgets or loses a password associated with an account, the user typically has to initiate a password recovery procedure to regain access to the account. However, many existing password recovery procedures introduce security vulnerabilities.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

One or more example embodiments are directed to a system and method for an account recovery protocol (ARP) as a mechanism for resetting a master password and to allow users of a password manager to recover access to their accounts and encrypted stored data associated with a network service, such as in a cloud service, in the event the user forgets an associated "master password". In one more embodiments, a system operator maintains no knowledge of the master password associated with the service itself. In particular embodiments, the account recovery protocol facilitates "account/access" recovery as opposed to "master password" recovery, since some password managers do not maintain a stored copy of the master password at any time in order to protect user's privacy and data confidentiality even from the standpoint of the service provider.

In one or more embodiments, a password manager is a part of a authentication platform including a multi-faceted architecture to consolidate user authentication as described herein. In various embodiments, a password manager provides centralized authentication access to network services such as services within in a cloud. In one or more embodiments, services or entities that subscribe to an authentication service, referred to as "Relying Parties" (RPs), use the authentication service to set up authentication factors that are required of users before the RPs provide their services to the users. In one or more embodiments, a password manager application presents a dashboard displaying all the cloud services the user uses in the dashboard to users who subscribe to it in order to allow authentication requirements for services the user utilizes to be entered, provide the requested authentication factors when asked, and to access these services in a centralized fashion without redundant and separate login attempts. The password manager requires users to set up a master password known only to the account holder. The master password much like other passwords is utilized for user authentication and facilitates login to accounts and gaining access to the user's services, but it also has another significant role, which is to generate keys to be used for encryption of user data as well as other keys to aid in the recovery process.

Figure 1:
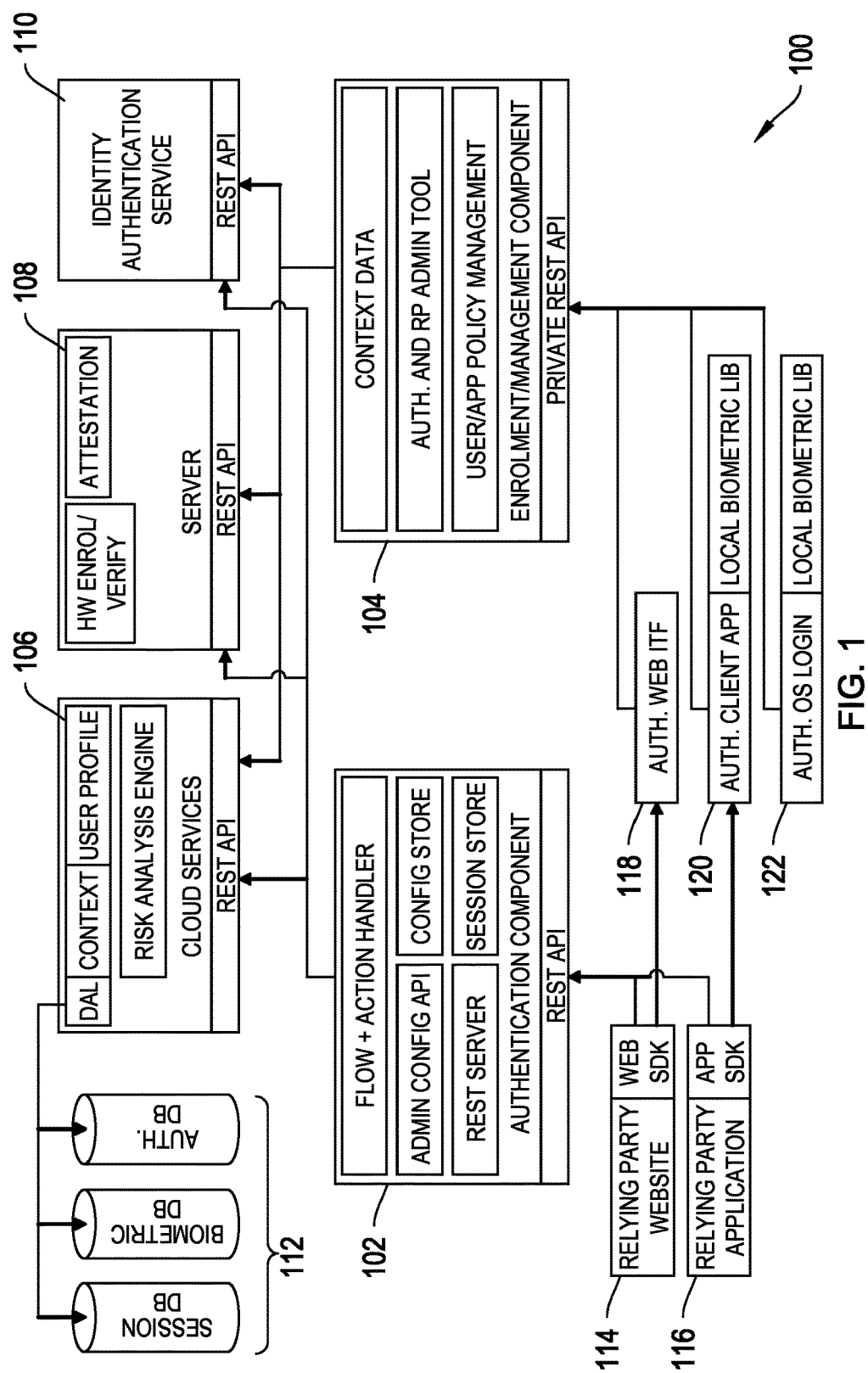
FIG. 1 illustrates a high level architecture for user account recovery including client side and server side components according to one embodiment.

FIG. 1 illustrates a high level architecture 100 for user account recovery including client side and server side components according to one embodiment. In the particular embodiment illustrated in FIG. 1, architecture 100 includes an authentication component 102 and an enrolment/management component 104. Authentication component 102 includes one or more authentication modules configured to handle authentication requests from client devices as will be further described herein. In the illustrated embodiments, the authentication modules of authentication component 102 include a flow and action handler module, an administration configuration application programming interface (API), a configuration store, a Representational State Transfer (REST) server, a session store, and a REST API. In a particular embodiment, the authentication modules are configured according to the OAuth open standard. Enrolment/management component 104 includes a context data module, a relying party administration tool, a user/application policy management module and a private REST API.

Authentication component 102 and enrolment/management component 104 are each in further communication with cloud services 106, a server 108, and identity authentication service 110. Clouds services 106 further include a data abstraction layer (DAL), a context module, a user profile module, a risk analysis engine, and a REST API. Server 108 includes a hardware enrolment/verification module, an attestation module, and a REST API. Identity authentication service 110 includes a REST API configured to facilitate communication with other components within architecture 100. Cloud services 106 are in further communication with one or more databases 112. In the particular illustrated embodiment, databases 112 includes a session database, a biometric database, and an authentication database.

Architecture 100 further includes a relying party website 114 and a relying party application 116 residing in one or more servers associated with one or more relying party entities. Each of relying party website 114 and relying party application 116 are in communication with authentication component 102. Relying party website includes a web software development kit (SDK) and is in further communication with an authentication web interface 118. Authentication web interface 118 is in further communication with enrolment/management component 104. Replying party application 116 is in further communication with an authentication client application 120. Authentication client application 120 is in further communication with enrolment/management component 104. Architecture 100 further includes an authentication OS login component 122 in communication with enrolment/management component 104. Each of authentication client application 120 and authentication OS login component 122 includes a local biometric library to facilitate obtaining biometric data from a user.

Authentication component 102 is configured to handle authentication requests for the authentication functionality and create an authentication specific flow and action handler that interacts with components such as user profile, policy, and biometric components to handle authentication requests. During an enrolment procedure, enrolment/management component 104 is interfaced with various components via the private REST API and creates a user profile for a particular user and associates the user profile with a relying party (RP) client identifier (ID) identifying a particular RP client. In one or more embodiments, the user profile and RP client policies are created and stored in one or more databases (DBs) 112. In particular embodiments, the DB structure for the user profile, RP application policies and context data is shared with authentication module 102 for authentication requests.

In one example embodiment, a policy engine within one or more authentication servers manages policy for authentication of a user to one or more RP entities. In a particular embodiment, a policy associated with the user is configurable by both a subscribing RP entity and a user's own security settings to control access by the user to resources provided by the RP entity. In particular embodiments, a minimum security level for use of authentication factors is set and the user and/or the RP entity may increase the level and number of factors for authentication but not reduce it.

In accordance with various embodiments, account recovery protocol (ARP) is provided in various embodiments as a recovery mechanism to users. In one or more embodiments, a user may be provided with an option to set up the recovery mechanism beforehand so that in the event the user forgets an associated master password, the user can recover from and restore loss of access to the user's services.

Figure 2:
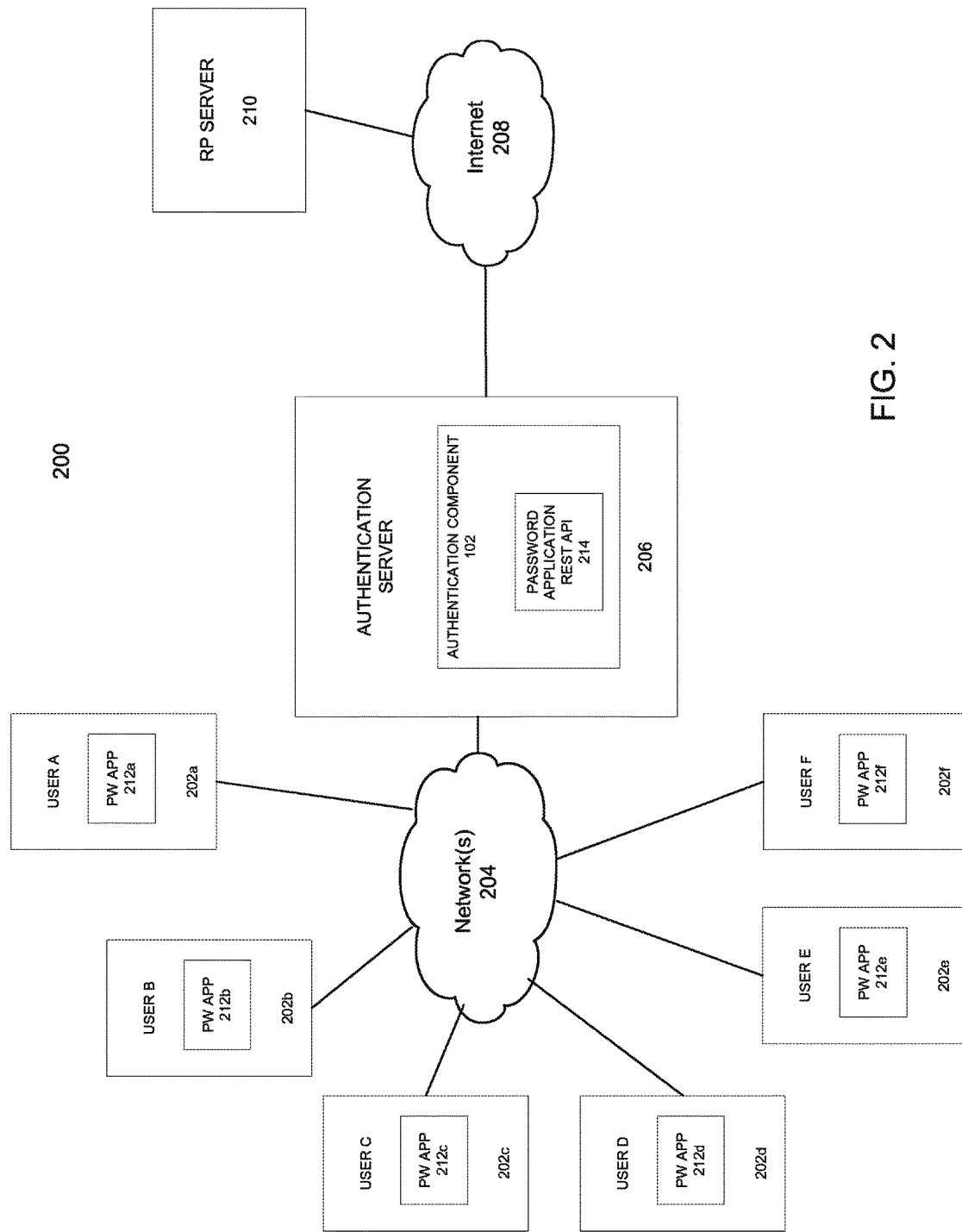
FIG. 2 illustrates a communication system for user account recovery in accordance with one embodiment.

FIG. 2 illustrates a communication system 200 for user account recovery in accordance with one embodiment. The communication system 200 includes a first client device 202a associated with a User A, a second client device 202b associated with a User B, a third client device 202c associated with a User C, a fourth client device 202d associated with a User D, a fifth client device 202e associated with a User E, and a sixth client device 202f associated with a User F. Each of client devices 202a-202f are in communication with an authentication server 206 via one or more network(s) 204. Network(s) 204 may include one or more of a mobile access network, the Internet, or any other suitable network to allow client devices 202a-202f to communicate with authentication server 206. Authentication server 206 is in further communication with a relying party (RP) server 210 via the Internet 208. First client device 202a includes a first password application 212a, second client device 202b includes a second password application 212b, third client device 202c includes a third password application 212c, fourth client device 202d includes a fourth password application 212d, fifth client device 202e includes a fifth password application 212e, and sixth client device 202f includes a sixth password application 212f. Each of password applications 212a-212f is configured to allow a user of their respective client devices 202a-202f to communicate with authentication server 102 to perform various password setup and recovery procedures as further described herein.

The authentication server 206 includes authentication component 102. Authentication component includes a password application REST API 214. In particular embodiments, authentication server 206 may be located within a core network of a service provider. Password application REST API 214 is configured to interface with the respective password applications 212a-212f of client devices 202a-202f to allow authentication component 102 to perform the password setup and subsequent password recovery operations as described herein to allow a user associated with one or more of clients devices 202a-202f to access resources, services, applications and/or content associated with RP server 210 such as streaming audio, streaming video, video content, audio content, or any other desired content provided by RP server 210.

Client devices 202a-202f may include any electronic or computing device capable of accessing resources provided by RP servers 210. These client devices 202a-202f can include, for example mobile phones, desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these. The computing device may use operating systems that include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Relying party (RP) server 210 may include servers associated with entities such as web sites, vendors and other providers of data, services, and applications that require their users to be identified and authenticated before accessing their resources.

In an example implementation, client devices 202a-202f, authentication server 206, and RP server 210 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 200, each of client devices 202a-202f, authentication server 206, and RP server 210 can include memory elements for storing information to be used in the operations outlined herein. Each of client devices 202a-202f, authentication server 206, and RP server 210 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 200 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, computer code, or processor instructions that are executed to carry out the activities described herein.

In an example implementation, network elements of communication system 200, such as client devices 202a-202f, authentication server 206, and RP server 210, may include software modules to achieve, or to foster, operations as outlined herein. These modules may be suitably combined in any appropriate manner, which may be based on particular configuration and/or provisioning needs. In certain embodiments, such operations may be carried out by hardware, implemented externally to these elements, or included in some other network device to achieve the intended functionality. Furthermore, the modules can be implemented as software, hardware, firmware, or any suitable combination thereof. These elements may also include software that can coordinate with other network elements in order to achieve the operations, as outlined herein.

Additionally, each of client devices 202a-202f, authentication server 206, and RP server 210 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, computer code, electronic instructions, or any suitable combination thereof. Any of the potential processing elements, modules, and machines described herein should be construed as being encompassed within the broad term 'processor.'

In accordance with one or more embodiments, the account recovery protocol (ARP) described herein may be implemented as an optional feature that is set up by a user of a password manager application to be used in the event an account recovery becomes necessary. In one or more embodiments, an account holder, such as user A associated with first client 202 sets up a master password to gain access to the password manager application. In accordance with one or more embodiments, the master password has two uses: 1) user authentication; and 2) encryption of user data. In accordance with various embodiments, two cryptographic keys are derived from the master password, one using an account holder e-mail address as the salt (used for authentication), and a second using a unique/random salt used for encryption of user data. A salt is data that is used as an additional input for the generation of a cryptographic key.

A major concept behind one or more embodiments of the account recovery protocol (ARP) described herein is an account recovery key (ARK), which is a randomly generated secret key that is used to encrypt an account recovery bundle (ARB). In particular embodiments, an ARB is a document in JavaScript Object Notation (JSON) format that contains, among other recovery attributes, two important pieces of recovery data: an Authentication Token One Time Password (OTP) and a Content Encryption Key (CEK). In particular embodiments, both the OTP and CEK are required to recover an account and remain a secret on a server until they are required to complete an account recovery request (ARR).

In one or more particular embodiments, an ARB is encrypted with an ARK referred to as an ARB_ARK. The ARK secret is held or stored only by the account holder (e.g., the forgetful user). In one or more embodiments, the ARK secret is split into a predetermined number m pieces, and each piece is securely shared with an ARP Trusted Friend (ARPTF) to be kept in escrow until needed while the contents of the ARK secret and pieces are hidden from the point of view of the ARPTF.

In one or more embodiments ARPTFs are themselves also valid password manager application account holders. In particular embodiments, a trusted friend is invited by the account holder to be an ARPTF and has the option to accept or reject the invitation. In particular embodiments, the account holder can modify the list of ARPTFs at will. In one or more embodiments, the ARK secret is split and shared to the ARPTFs via Shamir's Secret Sharing (SSS). SSS is a cryptographic algorithm in which a secret is divided into a predetermined number of parts, giving each participant its own unique part, where some or all of the parts are needed to reconstruct the secret. In some embodiments, an object or device under the control of the user (e.g., a phone, tablet, PC, USB key, piece of paper with a printed bar code, etc.) can also serve as an ARPTF by holding one fragment from the SSS. In the embodiment illustrated in FIG. 2, user B associated with second client device 202b, user C associated with third client device 202c, user D associated with fourth client device 202d, user E associated with fifth client device 202e, and user F associated with sixth client device 202f are each designated as trusted friends, or ARPTFs, of the account holder user A associated with first client device 202a.

If it becomes necessary to recover an account, the account holder issues a request for account recovery to authentication server 206. Upon initiating the recovery process, the account holder is presented with a validation loop. In particular embodiments, the validation loop includes gathering the account holder's email address, a response to a CAPTCHA challenge (e.g., a verification of text or an image to prove liveness), and a provisional master key that the user chooses and enters to be used in the recovery process. CAPTCHA (an acronym for "Completely Automated Public Turing test to tell Computers and Humans Apart") is a type of challenge-response test to determine whether or not the user is human. Authentication server 206 then generates an Out-of-band Confirmation Code (OCC), a small secret (e.g. a 4-digit code) to be provided to and used by ARPTFs for confirmation purposes to confirm that the out-of-band (OOB) communication was completed without tampering.

In one or more embodiments, authentication server 206 then instructs the account holder to contact the members of the ARPTF list, notify them of the request to help in the recovery, and to provide each of the members of the ARPTF with the OCC. In particular embodiments, all entries and entities along the way are verified by authentication server 206. The ARPTFs each receive a request to assist in account recovery including the OCC and are prompted to confirm the request. Upon receiving confirmation, authentication server 206 is allowed to retrieve the ARPTF's recovery token. The account holder's password application then decrypts each of the retrieved tokens and builds a consensus of the ARPTF responses. In one or more embodiments, SSS parameters are set up so that a consensus status is achieved if a predetermined number or portion of responses are received from the ARPTFs, for example >=50% or 3 out of 5, etc. Once a consensus status is reached the received recovery tokens are decrypted and assembled to rebuild the ARK. The ARK is used to decrypt the ARB to perform the recovery process. During the recovery process, procedures are taken to regenerate all required seeds, keys, new pieces, and new fresh key material and re-encryption to promote the provisional master key into the new master key, thereby allowing the user to login in via the new master key and regain control of the user's account and resources.

Various embodiments described herein make use of a master password as a source for cryptographic key generation for both authentication and user data encryption. In one or more embodiments, authentication server 206 uses the same secret (e.g., master password) for encryption based authentication and recovery of the user data, where the recovery knowledge is distributed among trusted and verified entities, as well authentication server 206 while unaware of the exact contents of the recovery keys in order to insulate itself and counter against security threats aimed at password and recovery data.

In accordance with one or more embodiments, a recovery mechanism is provided in which a provisional password is subject to checks and cryptographic operations, and only when completely verified based on distributed knowledge of the data, accepted to replace the previously known good master password. In particular embodiments, an SSS algorithm is used to fracture and distribute recovery keys among multiple trusted entities. The following sections outline example high level operations for various sequences of the ARP in accordance with one or more specific embodiments. One or more embodiments use AES-CCM, which is an Authenticated Encryption with Associated Data (AEAD) algorithm, a class of block cipher mode of operation which can encrypt part or whole messages while it authenticates the whole at the same time. Advanced Encryption Standard (AES) is a block cipher used for encrypting all data in the system, and Counter with CBC-MAC (CCM) is a block cipher mode of operation used with AES to provide both Confidentiality as well Integrity of encrypted data. In accordance with one or more embodiments, only part of the message is encrypted while the rest remains unencrypted but authenticated. In particular embodiments, (ENC) is used as an indication for encrypted+authenticated and (MAC) for authenticated only.

In the following example sequences, the following entities are used:

User A—The "Forgetting Fellow" who uses the ARP because he might forget his master password at some time. User A is associated with first client device 202a having a client application, password application 212a, that user A uses to interact with authentication server 206.

Users B, C, D, E, F—are members of user A's trusted friends (i.e. ARPTFs) with whom User A shares pieces of his account recovery key (ARK). As discussed, the ARK is a randomly generated secret key used to encrypt the ARB that is held only by the account holder (user A) and is split into m pieces, each securely shared with a Trusted Friend (e.g., users B, C, D, E, F). In particular embodiments, users B-F are associated with respective client devices 202b-202f, each having a respective password manager application 212b-212f.

Password REST API 214—a service within authentication component 102 of authentication server 206 that authenticates, stores assets, allows sharing, and acts as a control for the ARP.

Figure 3A:
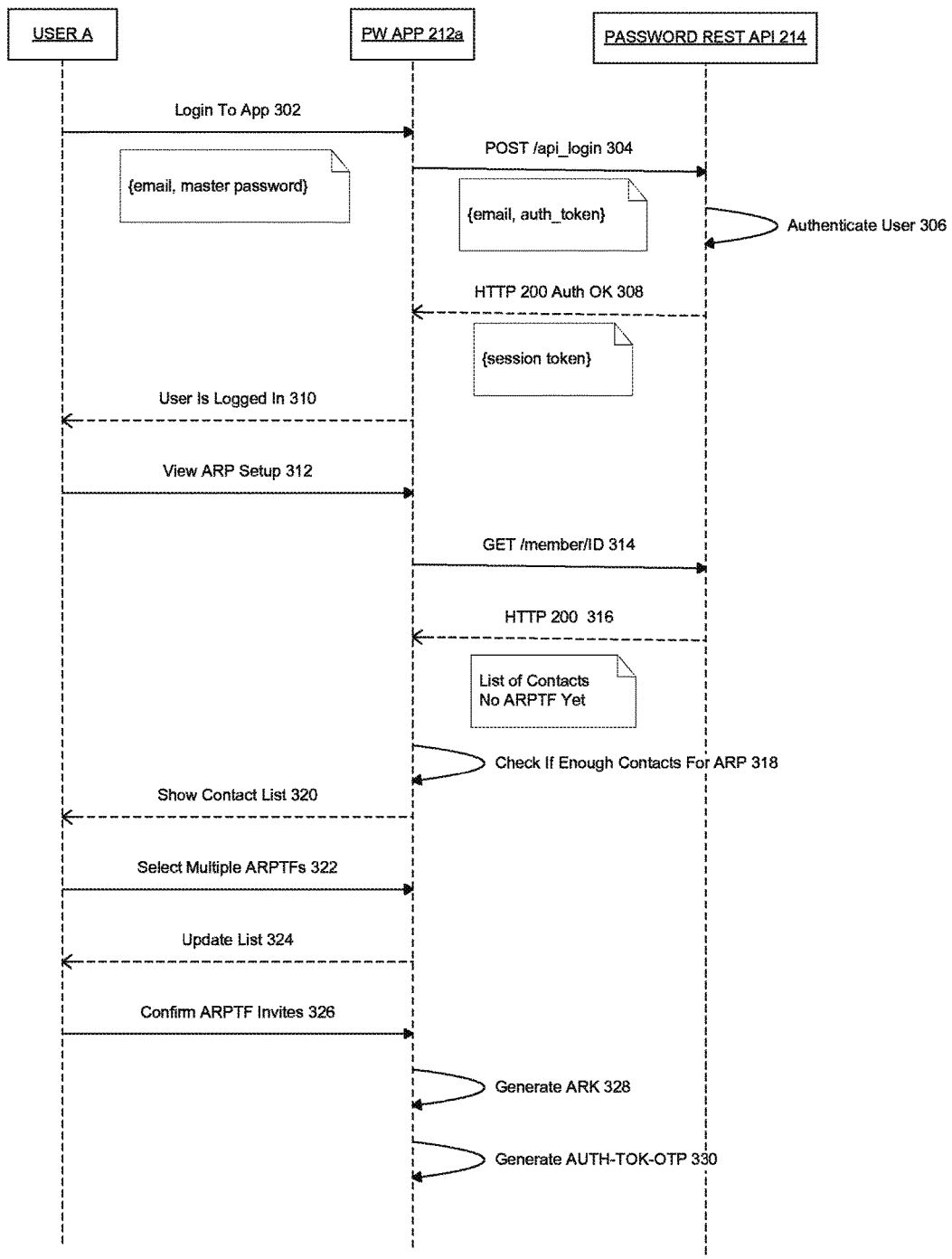
FIGS. 3A-3B illustrate an example of a process flow for account recovery protocol setup and management in accordance with one embodiment.
Figure 3B:
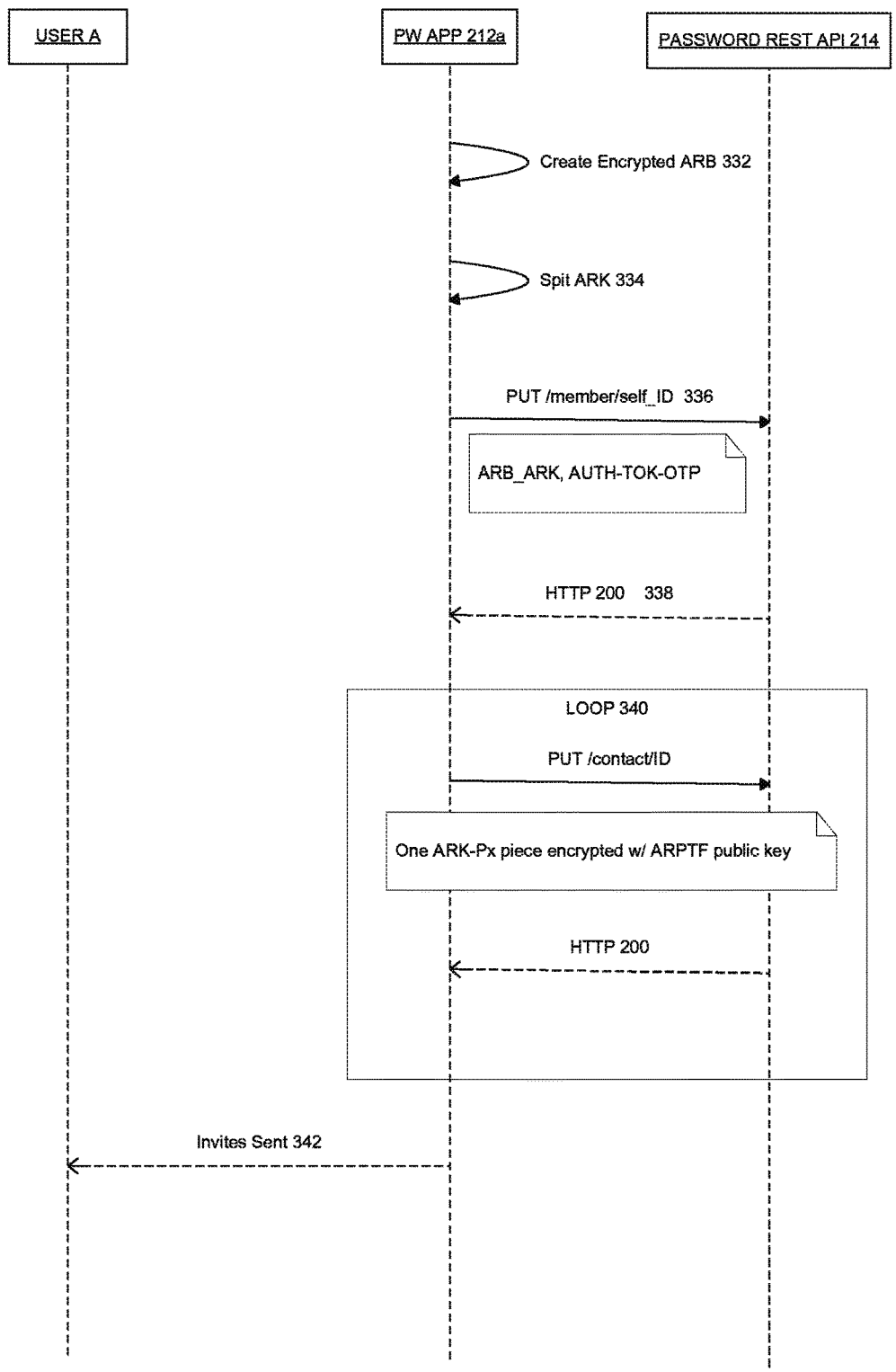

FIGS. 3A-3B illustrate an example of a process flow 300 for account recovery protocol setup and management in accordance with one embodiment. Prior to setup, user A creates an account associated with password application 212a. In one or more embodiments, creating the account includes specifying a master password for the account. After account creation, user A send an invite request to each of user B, user C, user D, user E, and user F as friends associated with his account. In one or more embodiments, user B, user C, user D, user E, and user F may either already have their own account or be prompted to create their own account in response to receiving the request. One or more of user B, user C, user D, user E, and user F may confirm the friendship request such that user A has enough friends linked to his account to proceed with an account recovery protocol (ARP) setup phase. In one or more embodiments, the friend relationship between user A and each of user B, user C, user D, user E, and user F is stored in a database by authentication server 206.

In 302, user A of first client device 202a initiates a login procedure to password application 212a of first client device 202a using his master password. In particular embodiments, user A enters an email address and a master password into password application 212a using a graphical user interface (UI) associated with first client device 202a. User A may then navigate to an ARP setup screen within the UI to initiate ARP setup. In 304, password application 212a sends a request for authentication (POST /api_login) of user A to password application REST API 214 of authentication server 206. In a particular embodiment, the request for authentication includes the email address associated with user A and an authentication token. In 306, authentication server 206 authenticates user A against a database using the email address and authentication token. In 308, password application 212a receives an authentication response (HTTP 200 Auth_OK) from authentication server 206 indicative that user A has been authenticated. In particular embodiments, the authentication response includes a session token. In 310, password application 212a provides an indication to user A that user A is logged in.

In 312, user A views an ARP setup screen within the UI provided by password manager application 212a and initiates ARP setup. In 314, password application 212a sends a request to authentication server 206 to retrieve a member object (HTTP GET/member/{member_id}/) containing a list of contacts corresponding to the account (e.g., user B, user C, user D, user E, user F) that have been designated as friends of user A. In 316, password manager application 212a receives a list of contacts (e.g., friends) associated with the account of user A in which some of the friends may have been designated as trusted friends (i.e., ARPTFs). If the account has already been setup for ARP, it contains an ARB_ARK JSON attribute but does not contain an Authentication Token One-Time-Password (AUTH-TOK-OTP) JSON attribute as it remains a secret stored on authentication server 206. The response message (/contacts/) including the received list of contacts may have some contacts which are considered to be ARPTFs. Contacts which are ARPTFs have an ARK-Px JSON attribute—i.e. the ARK piece that will be sent to them to hold in escrow. In 318, password manager application 212a determines whether user A has enough contacts to continue with setup of the account recovery protocol. If user A has enough contacts, the setup procedure continues. Otherwise, user A is prompted by password manager application 212a to invite more friends to participate in account recovery.

In 320, password manager application 212a displays the contact list to user A. In 322, user A selects the friends from the contact list that user A trusts to participate in the account recovery protocol (ARP) as ARPTFs. In 324, password application 212a displays the updated contact list to user A and prompts user A to confirm the selections. In 326, user A confirms the ARPTF invites to password manager application 212a.

In 328, password application 212a generates a fresh Account Recovery Key (ARK) for user A. In a particular embodiment, password application 212a generates a 256-bit Account Recovery Key (ARK) using a Cryptographically Secure Pseudo Random Number Generator (CSPRNG) to function as a primitive used to generate secret keys. In 330, password application 212a generates a fresh Authentication Token One-Time-Password (AUTH-TOK-OTP). In a particular embodiment, the AUTH-TOK-OTP is a 256-bit value. In 332, password application 212a creates an encrypted Account Recovery Bundle (ARB) including the AUTH-TOK-OTP and the Content Encryption Key (CEK) which is encrypted using the ARK. In one or more embodiments, the ARB is a JSON document that includes a message authentication code (MAC) portion identifying a bundle scheme and creation date, and an encryption portion including the AUTH-TOKEN-OTP (ENC) and the account's Content Encryption Key (CEK)-(ENC).

In 334, password application 212a splits the ARK into a predetermined number m pieces (the number of ARPTFs selected). In a particular embodiment, password application 212a splits the ARK into the predetermined number of pieces using Shamir's Secret Sharing (SSS). As a result, a complete list of shared pieces is generated in which each shared piece (ARK-Px) is kept in escrow as hidden in an ARPTF's account and may later be used to recover the ARK. In one or more embodiments, SSS parameters are set up so that there is a consensus of user A's ARPTFs (e.g., >=50%)—i.e. 3 of 5 required in order to recover the ARK. In particular embodiments, these security parameters may be adjusted as a tradeoff between convenience and consensus.

In 336, password application 212a updates user A's member object stored at authentication server 206 with the ARB encrypted with the ARK (ARB_ARK) and the AUTH-TOK-OTP. In particular embodiments, password application 212a sends an HTTP PUT /member/{member_id}/ message to the password application REST API 214 of authentication server 205 including the ARB_ARK and the AUTH-TOK-OTP and an identification of user A (member_id). In 338, password application REST API 214 returns a copy of the updated Member object, which does not contain the AUTH-TOK-OTP, as it remains a secret stored on authentication server 206.

In 340, password application 212a shares each piece ARK-Px with a different ARPTF of user A using an ARP Invitation (ARPI) for each of user A's ARPTFs. In a particular embodiment, password application 212a sends a HTTP PUT /contact/{contact_id}/message to each ARPTF identified by a contact identifier (contact_id) including an updated Contact object which contains a particular ARK-Px encrypted with the Public Key for this ARPTF. The password REST API 214 keeps the ARK-Px pieces in escrow by marking them hidden from the point of view of the ARPTF. In one or more embodiments, in order to complete the ARP Invitation (ARPI), the ARPTF receives a notification explaining that one of the receiving party's contacts has asked him to become an ARPTF. The receiving party can either accept or deny the ARPI. In particular embodiments, password REST API 214 sends an HTTP 200 message including an indication of whether the particular ARPTF accepted the invitation.

In 342, password application 212a sends an acknowledgement message to user A including an acknowledgment that the invites were sent and an indication of whether each of the ARPTFs accepted the invitations. At a later time, in particular embodiments user A can manage the list of ARPTFs by performing one or more of the previously described procedures again. If user A has successfully completed the previous procedures at least once, the existing attributes are stored by authentication server 206 which user A can subsequently modify.

Figure 4A:
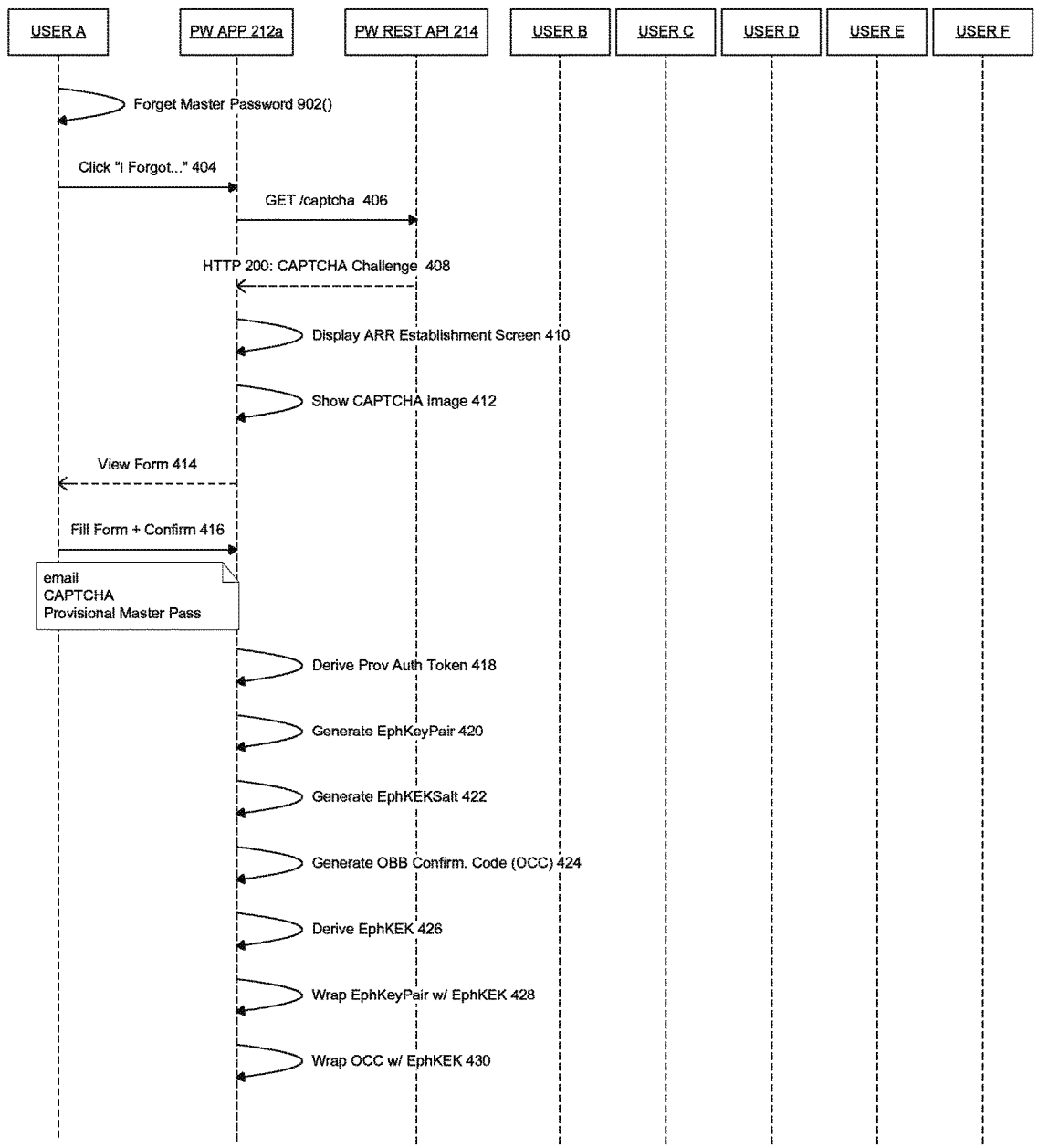
FIGS. 4A-4B illustrate an example of an account recovery request establishment process flow for the account recovery protocol in accordance with one embodiment.
Figure 4B:
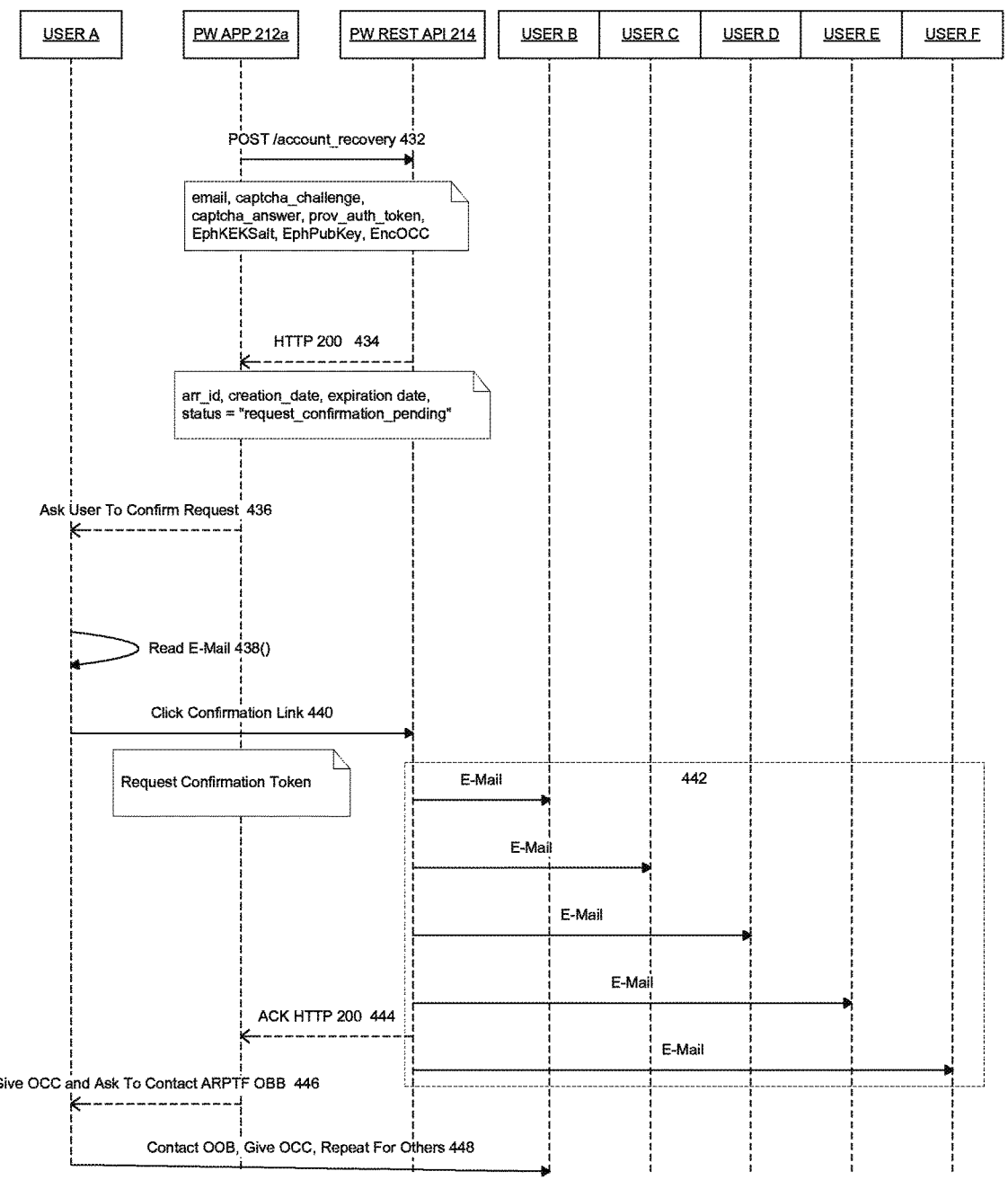

FIGS. 4A-4B illustrate an example of an account recovery request establishment process flow 400 for the account recovery protocol in accordance with one embodiment. The account recovery request establishment process establishes a new account recovery request. The example first process flow of FIGS. 4A-4B assumes that user A already has enough ARPTFs to perform ARP setup directly. In the embodiment of FIGS. 4A-4B, user A has unfortunately forgotten his Master Password and is unable to login to his account. However, since user A has setup the ARP in the past can use ARPTFs to recover access to his account. In 402, user A forgets his master password. In 404, user A clicks an "I forgot my Master Password" option within a graphical user interface provided by password application 212a of client device 202a.

In 406, password application 212a sends a request to retrieve a fresh CAPTCHA challenge to authentication server 206. In particular embodiments, password application 212a sends a GET /captcha message to password application REST API 214 of authentication server 206 to request a CAPTCHA challenge. In 408, password application 212a of client device 202a receives the CAPTCHA challenge response message from authentication server 206. In particular embodiments, authentication server 206 sends an HTTP 200 CAPTCHA challenge to client device 202a.

In 410, password application 212a of client device 202a displays an Account Recovery Establishment screen to user A within the graphical user interface in response to receiving the CAPTCHA challenge response message. In one or more embodiments, the Account Recovery Establishment Screen displays a GUI form including one or more of the following items: E-mail form field; image representation of the CAPTCHA challenge; CAPTCHA answer form field; a password field to input a provisional Master Password; and a "Request Account Recovery" button. In 412, password application 212a of client device 202a displays the CAPTCHA image to user A within the graphical user interface. In 414, user A views the form within the Account Recovery Establishment screen, and in 416 user A fills in the form and clicks the confirmation button.

In 418, password application 212a of client device 202a derives a Provisional Authentication Token (PBKDF2) using the Provisional Master Password and E-mail. In 420, password application 212a generates an Ephemeral Rivest Shamir Adelman (RSA) KeyPair (EphKeyPair). In a particular embodiment, the EphKeyPair is a 2048 bit RSA key pair. In 422, password application 212a generates an Ephemeral Key Encryption Key (KEK) Derivation Salt (EphKEKSalt). The Key Encryption Key (KEK) is a secret key that is derived from the Master Password and a randomly generated salt. In a particular embodiment, the EphKEKSalt is a 256-bit value. In 424, password application 212a generates an Out-of-band Confirmation Code (OCC). In a particular embodiment, the OCC is a four numerical digit code. In 426, password application 212a derives an Ephemeral Key Encryption Key (EphKEK) (PBKDF2 w/ EphKEKSalt, Master Password). The Key Encryption Key (KEK) is secret key that is derived (PBKDF2) from the Master Password and a randomly generated salt. In 428, password application 212a wraps the EphKeyPair with the EphKEK, and in 430 password application 212a wraps the OCC with the EphKEK.

In 432, password application 212a of client device 202a creates an account recovery request message and sends the account recovery request message to password application REST API 214 of authentication server 206. In a particular embodiment, the account recovery request message is formatted as an unauthenticated POST /account_recovery/message including a JSON Request Body including: the email address; captcha_challenge; captcha_answer; provisional_auth_token (the new Master Password derived as an authentication token); ephemeral_kek_derivation_salt; ephemeral_public_key; encrypted_ephemeral_keypair; and encrypted_occ (Out-of-band Confirmation Code). In 434, password application REST API 214 of authentication server 206 sends a account recovery response message to password application 212a of client device 202a. In a particular embodiment, the account recovery response message is an HTTP 200 message including JSON Response Body having: an Account Recovery Request ID (arr_id); creation_date=NOW; expiration_date=NOW+expiration interval (e.g., 48 hours); and status="request_confirmation_pending". In particular embodiments, the Account Recovery Request ID is a unique, random ID returned by password REST API 214 upon successful creation of a new ARR.

Upon receiving the account recovery response message, in 436 password application 212a of client device 202a prompts user A to read the email and confirm the request by clicking a link included in the email just sent. In 438, user A reads the email. In 440, user A clicks the confirmation link and password application 212a of client device 202a sends a confirmation message indicative of the confirmation to password application REST API 214 of authentication server 206. In one or more embodiments, the confirmation message includes a request confirmation token (request_confirmation_token). In particular embodiments, a request confirmation token is a randomly generated token used to confirm the start of an ARP through an e-mail verification loop.

In 442, password application REST API 214 of authentication server 206 sends an email to each of user B, user C, user D, user E, and user F indicating that user A has requested the user's assistance to recover his account. In 444, the REST API 214 of authentication server 206 sends an acknowledgement to password application 212a of client device 202a. In 446, password application 212a of client device may then display the OCC to user A and display instructions instructing user A to contact each ARPTF. In a particular embodiment, the message may include an email including a confirmation link. In particular embodiments, if user A forgets the identity of one or more ARPTFs user A may use a GUI to recall the identity of the ARPTFs associated with user A. In 448, user A contacts and provides the OCC to each ARPTF as a means to prevent phishing and ensure that the trusted friends were indeed contacted through other means outside the protocol. The procedure 400 then ends. In particular embodiments, user A may contact each ARPTF using client device 202a.

In the particular embodiment described in FIGS. 4A-4B, an e-mail verification loop is used as a means of authentication to trigger an account recovery process. A significant portion of users have nearly constant access to e-mail through the use of electronic devices such as smart phones. Accordingly, for these users the likelihood of a circumstance occurring in which a particular user may forget his or her master password and have simultaneously lost all forms of access to e-mail is small. However, since access to that e-mail account has some impact on the security of the recovery (out-of-band confirmation code provides the other portion), in other embodiments other methods of triggering an account recovery request establishment procedure may be used. For example, in a particular embodiment Image Based Authentication (IBA) or micro-payments may be used to validate or assert ownership of an account.

Figure 5:
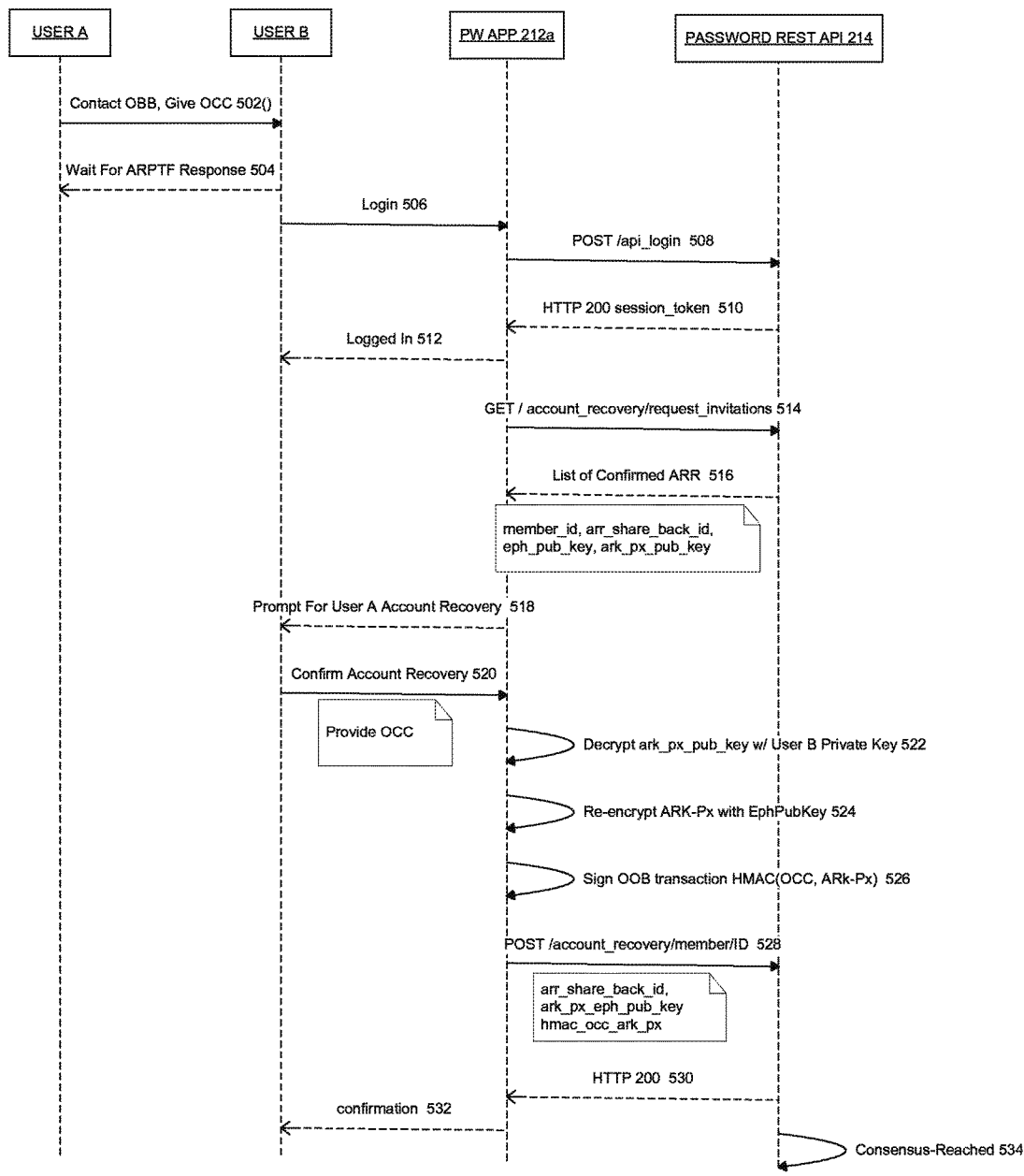
FIG. 5 illustrates an example of an account recovery request invitation process flow for the account recovery protocol in accordance with one embodiment.

FIG. 5 illustrates an example of an account recovery request invitation process flow 500 for the account recovery protocol in accordance with one embodiment. In one or more embodiments, process flow 500 is automatically initiated after the end of the account recovery request establishment flow of FIGS. 4A-4B. In 502, user A contacts user B (a trusted friend) through his own means and provides the out-of-band confirmation code (OCC) to user B as an indication that user A is requesting the user's help to recover his or her account. Although not illustrated in FIG. 5, user A also contacts and provides the OCC to each of the ARPTFs (e.g., trusted friends). In 504, user A awaits for a response from user B and each ARTPF. In 506, user B performs a login to user B's password application 212 using second user device 202b. In 508, second password application 212b sends a login call indicative of user B's login to password REST API 214 of authentication server 206. In a particular embodiment, the login call is a POST API call. In 510, password REST API 214 sends a login acknowledgement to second password application 212b including a session token (session_token). In 512, second password application 212b provides an indication of a successful login to user B via a GUI of second client device 212.

In 514, second password application 212b sends a request for retrieval of any account recovery request invitations to password REST API 214 of authentication server 206. In a particular embodiment, the request is of the form: GET /account_recovery/request_invitations. In 516, password API 214 authenticates user B as an ARPTF and sends a list of account recovery request invitations to second password application 212b. In a particular embodiment, the account recovery request invitation list includes a member identifier (member_id), an account recovery request share back identifier (arr_share_back_id), an ephemeral public key (ephemeral_public_key), and an account recovery key shared piece encrypted with User B's public key (ark_px_ pub_key). In 518, if second password application 212*b* receives a non-empty list second password application 212*b* prompts user B for sharing back his or her ARK shared piece (ARK-Px) held in escrow to assist in account recovery. In 520, user B provides the OCC and a confirmation to second password application 212 to confirm account recovery. In a particular embodiment, user B may enter the OCC and click a "Confirm" button in a GUI of second user device 202*b*.

In 522, second password application 212*b* decrypts the "ark_px_pub_key" using user B's own private key, giving the plaintext ARK-Px, i.e. one of the pieces. In 524, second password application 212*b* re-encrypts the plaintext ARK-Px with the Ephemeral Public Key (EphPubKey). In 526, second password application 212*b* signs the OOB transaction using a keyed-hash message authentication code (HMAC) keyed with the out-of-band confirmation code (OCC) {HMAC(OCC, ARK-Px). In a particular embodiment, the transaction is signed using the SHA-256 cryptographic hash function. In 528, second password application 212*b* sends the ARR share back ID {arr_share_back ID}, ARK-Px encrypted with the ARR Ephemeral Public Key (ARREphPubK)) {ark_px_eph_pub_key}, and the HMAC of the ark_px keyed with the Out-of-band Confirmation Code {hmac_occ_ark_px} to password REST API 214 of authentication server 206. In particular embodiments, the ARR Ephemeral Public Key is a Public Key only valid for the duration of an ARR. In a particular embodiment, second password application 202*b* uses a POST message of the form POST/account_recovery/member/{member_id}/ having a JSON Request Body including the arr_share_back_id, ark_px_eph_pub_key, and hmac_occ_ark_px. In 530, password REST API 214 sends an acknowledgement to second password application 212*b*. In a particular embodiment, the acknowledgment is an HTTP 200 message. In 532, second password application 212*b* presents a confirmation message to user B indicating that the particular ARK-Px piece has been successfully shared. The procedures of 502-532 are repeated for one or more of the remaining ARPTFs of user A using their respective password applications in which password REST API 214 receives one or more shared ARK-Px pieces from each ARPTF. When enough shared ARK-Px pieces are received by password REST API 214, password REST API 214 updates the status of the account recovery request to a "consensus_reached" in 534 and the procedure 500 ends.

Figure 6A:
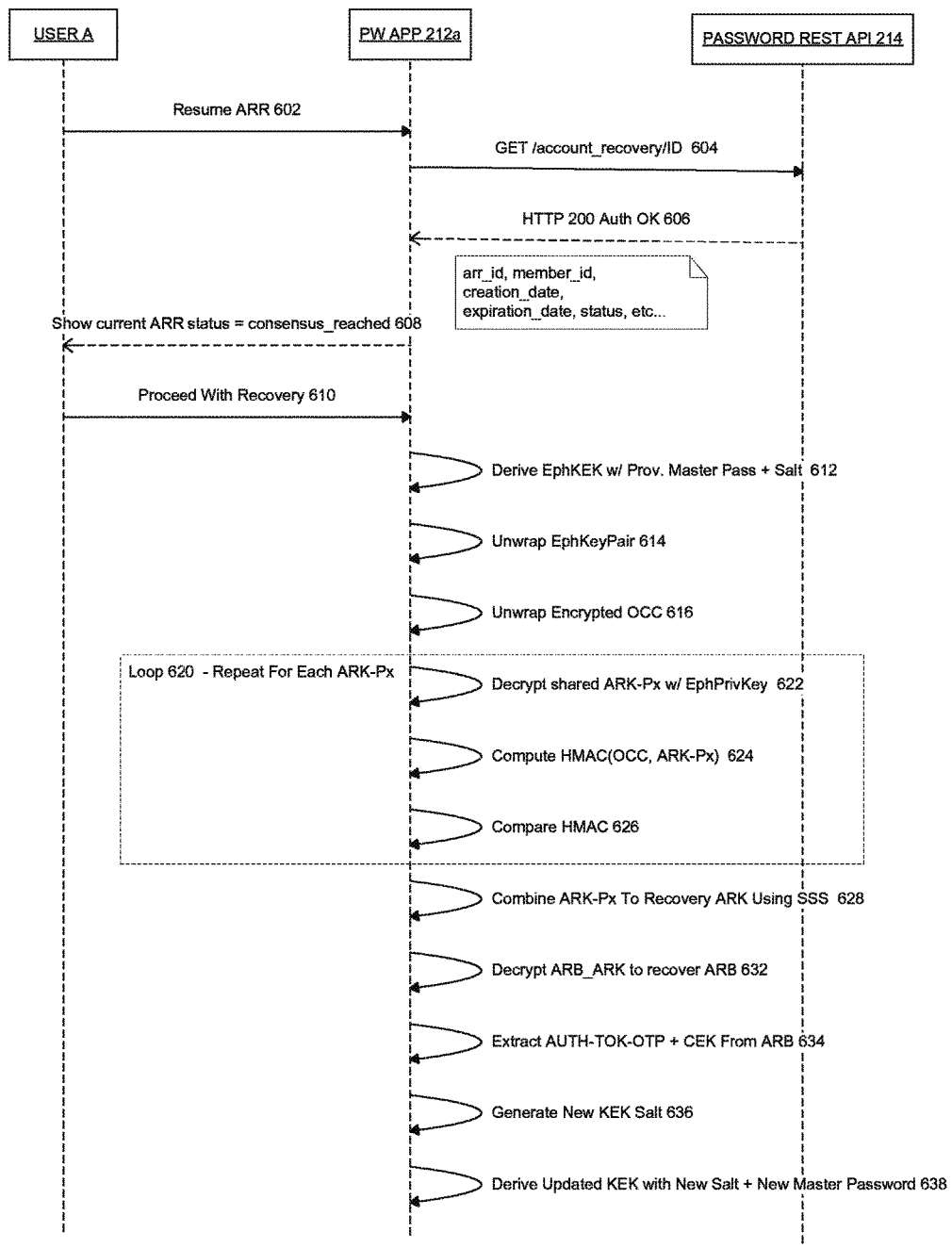
FIGS. 6A-6B illustrate an example of an account recovery request completion process flow for the account recovery protocol in accordance with one embodiment.
Figure 6B:
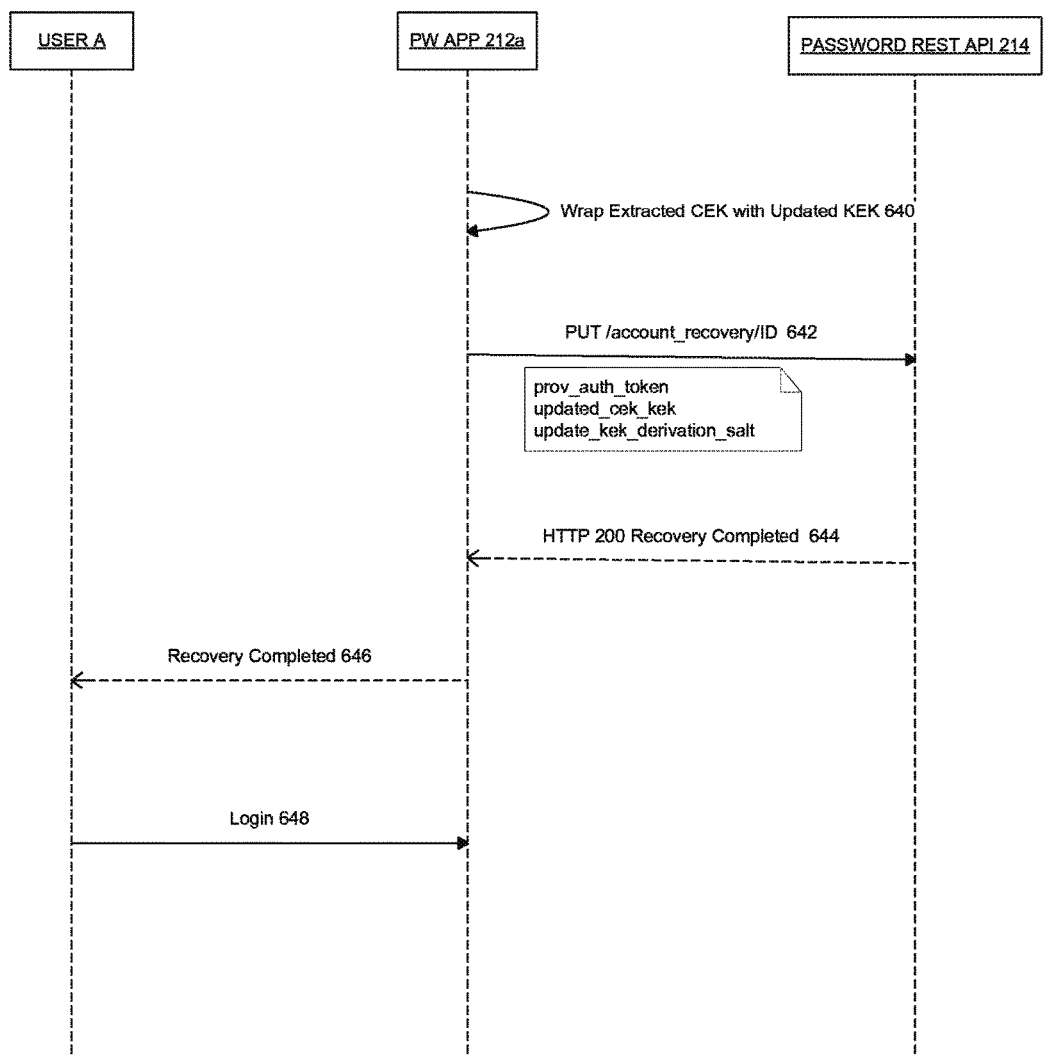

FIGS. 6A-6B illustrates an example of an account recovery request completion process flow 600 for the account recovery protocol in accordance with one embodiment. In one or more embodiments, process flow 600 is initiated after the end of the account recovery request invitation process flow of FIG. 5 in which consensus has been reached regarding the account recovery request. In 602, user A resumes the account recovery request procedure. In a particular embodiment, user A enters his or her Provisional Master Password which requires derivation of the Provisional Authentication Token (PBKDF2). In 604, first password application 212*a* sends a request to retrieve the updated version of the ARR record from password REST API 214 of authentication server 206. In a particular embodiment, the retrieval request is a GET request of the form GET /account_recovery/{arr_id}/. In a particular embodiment, the request is unauthenticated but only accessible via a universally unique identifier (UUID) and all data is encrypted and read-only. In 606, password REST API 214 sends a response including information necessary for the account recovery. In particular embodiments, the response is an HTTP 200 response with the following JSON response body:

a. Account Recovery Request ID (arr_id)
b. Member ID (member_id)
c. Creation Date for the request (creation_date)
d. Expiration Date for the request (expiration_date)
e. Status="consensus_reached"
f. ARR Share Back ID (arr_share_back_id)
g. ARB encrypted with ARK (arb_ark)
h. Ephemeral Key Encryption Key (KEK) derivation salt (ephemeral_kek_derivation_salt)
i. Ephemeral Public Key (ephemeral_public_key)
j. Encrypted Ephemeral Keypair {encrypted_ephemeral_keypair}
k. Encrypted OCC (encrypted_occ)
l. ARPTF list (arptf_list) (JSON Array)
  1. nickname
  2. ark_px_eph_pub_key—not 'null' for the ARPTF who have participated
  3. hmac_occ_ark_px In 608, first password application 212*a* sends an indication of the current ARR status="consensus reached" to user A. In 610, user A proceeds with account recovery. In 612, first password application 212*a* derives an ephemeral key encryption key (EphKEK) using the Provisional Master Password and a randomly generated salt. In 614, first password application 212*a* unwraps the ephemeral key pair (EphKeyPair) giving access to an Ephemeral RSA Private Key (EphPrivKey). In 616, first password application 212*a* unwraps the encrypted OCC. First password application 212*a* then enters a loop 620 that is repeated for each ARK-Px. In 622, first password application 212*a* decrypts each encrypted ARK-PX with the Ephemeral RSA Private Key (EphPrivKey). In 624, first password application 212*a* computes the keyed-hash message authentication code {HMAC(OCC, ARK-Px)}. In 626, first password application 212*a* compares the keyed-hash message authentication code (HMAC) with the HMAC of the ark_px keyed with the Out-of-band Confirmation Code (hmac_occ_ark_px) to determine if the condition HMAC(OCC, ARK-Px)==hmac_occ_ark_px is satisfied to indicate that the correct ARK-Px has been recovered. The loop of 622-626 is performed for each ARK-Px received from the ARPTFs until each ARK-Px is recovered and verified.

In 630, first password application 212*a* combines all decrypted ARK-Px using SSS to recover the account recovery bundle (ARB) encrypted with the account recovery key (ARB_ARK). In 632, first password application 212*a* decrypts the ARB_ARK to recover the account recovery bundle (ARB). In 634, first password application 212*a* extracts the Authentication Token One-Time-Password (AUTH-TOK-OTP) and content encryption key (CEK) from the ARB.

In 636, first password application 212*a* generates a new KEK Derivation Salt. In 638, first password application 212*a* derives an updated KEK with a new salt and Provisional Master Password. In 640, first password application 212*a* wraps the extracted CEK with the updated KEK.

In 642, first password application 212*a* sends an authenticated account recovery request message to password REST API 214 of authentication server 206. The authenticated account recovery request message includes the AUTH-TOK-OTP to be validated upon completion of the request, the provisional_auth_token to be matched against the Provisional Auth Token for this request, and the fresh salt for the new KEK (updated_kek_derivation_salt), and updated content encryption key key encryption key (updated_cek_kek). In a particular embodiment, the request message is a PUT message of the form PUT /account_recovery/{arr_id}/ having a JSON request body including AUTH-TOK-OTP, provisional_auth_token, updated_kek_derivation_salt—Fresh salt for the new KEK, and updated_cek_kek. In 644, password REST API 214 sends a confirmation that the account recovery request is completed to first password application 212a. In a particular embodiment, the confirmation message is an HTTP 200 message. In 646, first password application 212a provides a confirmation to user A that the account recovery request is completed. In 648, user A can login to first password application 212a using the Provisional Master Password which has been promoted to Master Password in order to regain access to the account. The flow 600 then ends.

Figure 7:
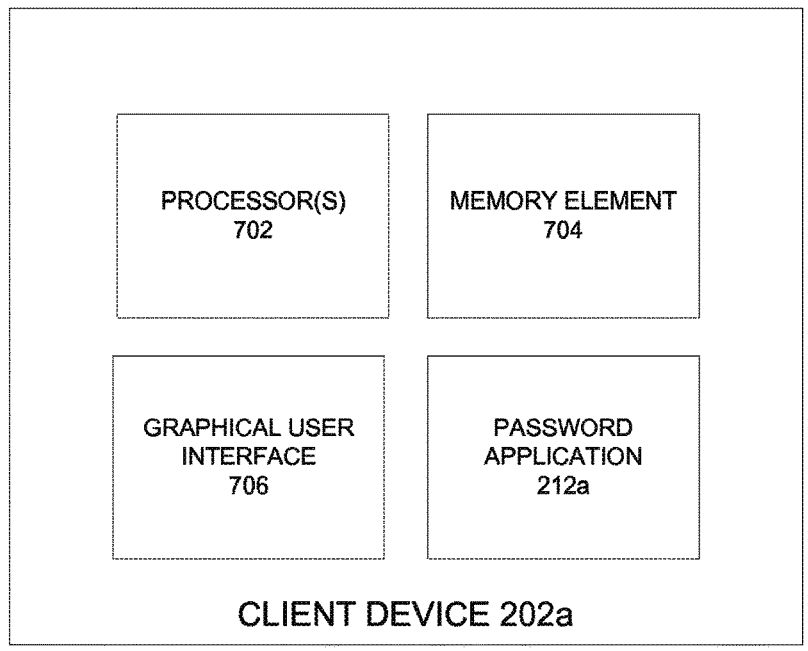
FIG. 7 is a simplified block diagram of an embodiment of a client device.

Referring now to FIG. 7, FIG. 7 is a simplified block diagram of an embodiment of client device 202a. Client device 202a includes processor(s) 702, a memory element 704, a graphical user interface 706, and password application 212a. Processor(s) 702 is configured to execute software instructions to perform various operations of client device 202a as described herein. Memory element 704 may be configured to store software instructions and data associated with client device 202a. Processor(s) 702 may be any type of processor, such as a micro-processor, an embedded processor, a digital signal processor (DSP), a network processor, or other device to execute code. Although only one processor(s) 702 is illustrated in FIG. 7, it should be understood that client device 202a may include more than one processor in some embodiments.

Graphical user interface 706 is configured to provide a graphical user interface to a user of client device 202a to facilitate the password setup and recovery procedures as described herein. Password application 212a is configured to perform password setup and recovery functions associated with client device 202a as described herein.

Figure 8:
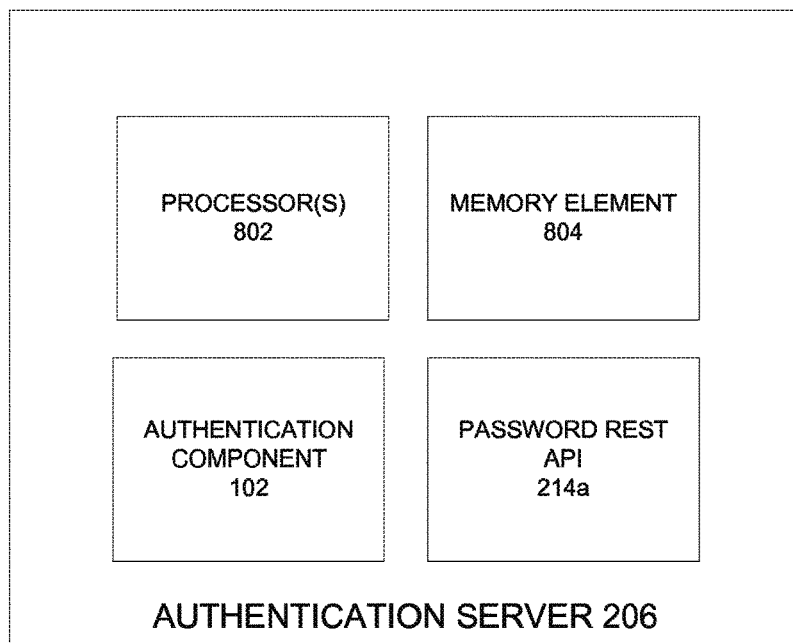
FIG. 8 is a simplified block diagram of an embodiment of an authentication server.

Referring now to FIG. 8, FIG. 8 is a simplified block diagram of an embodiment of authentication server 206. Authentication server 206 includes processor(s) 802, a memory element 804, authentication component 102 and password REST API 214. Processor(s) 802 is configured to execute software instructions to perform various operations of authentication server 206 as described herein. Memory element 804 may be configured to store software instructions and data associated with authentication server 206. Processor(s) 802 may be any type of processor, such as a micro-processor, an embedded processor, a digital signal processor (DSP), a network processor, or other device to execute code. Although only one processor(s) 602 is illustrated in FIG. 8, it should be understood that authentication server 206 may include more than one processor in some embodiments.

Authentication component 102 is configured to facilitate the authentication and password recovery functions of authentication server 206 as described herein, and password REST API 214 is configured to facilitate the password setup and recovery functions of password REST API 214 as described herein.

One or more embodiments may provide one or more of the following advantages over existing solutions: 1) the same password is used for authentication of the user as well as encrypting the user data for later recovery; 2) it does not maintain a copy of the Master Password (whether encrypted or in the clear); 3) it does not keep a database of user Master Passwords, and 4) though it may make use of conventional validation methods such as email confirmation, CAPTCHA verification to eliminate BOT activities, etc., during the initial validation of the Account Holder during recovery process, it does not utilize other conventional methods of verifying user identify (for example, asking a simple security question) and then allowing them to simply reset the password based on this initial validation, and 5) it has no specific knowledge of the Master Password itself for security reasons. Instead it distributes pieces of the knowledge of the Master Password recovery key in the form of encrypted tokens to be held in escrow among several trusted entities, without any of the trusted entities having specific knowledge of the contents of the token, to be called upon when necessary to piece together and help the forgetful user recover from the failed state, thereby restoring proper access to their resources. This, therefore presents a much more secure method of recovery without a single point of failure.

Conventional systems primarily use the system password for authentication purposes. In contrast, ARP uses the same password to generate separate cryptographic keys to authenticate the user and to encrypt their data. Conventional systems use simple security questions that the user sets up beforehand, or ask questions based on some known facts about the user and are highly susceptible to theft and reutilization to hack the user account. Saved passwords and password files are subject to theft and reutilization. One or more embodiments of the ARP described herein eliminate many similar security threats to the password keys and contents by tightening security around their use and transmission via various cryptographic operations along the way and conducts the recovery in an innovative way that results in re-encrypting the user's assets rather than simply replacing one access token with another.

Although one or more embodiments described herein are directed to use of a password manager and a master password, it should be understood that the principles described herein are applicable to other password-based user data encryption systems and/or applications such as for recovery of access to a user's stored/encrypted assets of any kind, e.g. files on a file-sharing service, encrypted backups, etc.

EXAMPLES

The following examples pertain to further embodiments.

Example 1 is at least one non-transitory computer storage medium to store computer code comprising: computer code to receive a request for recovery of an account associated with a user; computer code to send a CAPTCHA challenge to a user device associated with the user; computer code to receive an answer to the CAPTCHA challenge and a confirmation code wrapped by an encryption key derived from a provisional master password; computer code to send a notification of the request for recovery to one or more trusted entities associated with the user; and computer code to receive a confirmation of the request from one or more of the trusted entities, the confirmation including a recovery token associated with the particular trusted entity and an encrypted confirmation code.

In Example 2, the subject matter of Example 1 can optionally include computer code to determine that a consensus status has been reached responsive to receiving a predetermined number of the recovery tokens from the one or more trusted entities; and computer code to send the recovery token associated with each of the one or more trusted entities to the user device.

In Example 3, the subject matter of Example 2 can optionally include computer code to send an indication of the consensus status to the user device.

In Example 4, the subject matter of Example 2 can optionally include computer code to reset a new master password for the account responsive to determining that the consensus status has been reached.

In Example 5, the subject matter of Example 4 can optionally include wherein the new master password is reset using the received recovery tokens.

In Example 6, the subject matter of Example 5 can optionally include wherein the received recovery tokens are decrypted using an ephemeral private key and the encrypted confirmation code is used as a verification of the recovery token.

In Example 7, the subject matter of Example 6 can optionally include wherein the new master password is reset based upon combining the decrypted recovery tokens.

In Example 8, the subject matter of Example 4 can optionally include wherein the new master password is generated by the user device.

In Example 9, the subject matter of any of Examples 1-8 can optionally include computer code to receive a designation of the one or more trusted entities from the user.

Example 10 is a system comprising at least one processor and at least one memory element, wherein the system is configured for: receiving a request for recovery of an account associated with a user; sending a CAPTCHA challenge to a user device associated with the user; receiving an answer to the CAPTCHA challenge and a confirmation code wrapped by an encryption key derived from a provisional master password; sending a notification of the request for recovery to one or more trusted entities associated with the user; and receiving a confirmation of the request from one or more of the trusted entities, the confirmation including a recovery token associated with the particular trusted entity and an encrypted confirmation code.

In Example 11, the subject matter of Example 19 can optionally include wherein the system is further configured for: determining that a consensus status has been reached responsive to receiving a predetermined number of the recovery tokens from the one or more trusted entities; and sending the recovery token associated with each of the one or more trusted entities to the user device.

In Example 12, the subject matter of Example 11 can optionally include wherein the system is further configured for sending an indication of the consensus status to the user device.

In Example 13, the subject matter of Example 12 can optionally include wherein the system is further configured for generating a new master password for the account responsive to determining that the consensus status has been reached.

In Example 14, the subject matter of Example 13 can optionally include wherein the new master password is reset using the received recovery tokens.

In Example 15, the subject matter of Example 14 can optionally include wherein the received recovery tokens are decrypted using an ephemeral private key and the encrypted confirmation code is used as a verification of the recovery token.

In Example 16, the subject matter of Example 13 can optionally include wherein the new master password is generated by the user device.

In Example 17, the subject matter of any of Examples 10-16 can optionally include wherein the system is further configured for receiving a designation of the one or more trusted entities from the user.

Example 18 is a computer-implemented method comprising: receiving a request for recovery of an account associated with a user; sending a CAPTCHA challenge to a user device associated with the user; receiving an answer to the CAPTCHA challenge and a confirmation code wrapped by an encryption key derived from a provisional master password; sending a notification of the request for recovery to one or more trusted entities associated with the user; and receiving a confirmation of the request from one or more of the trusted entities, the confirmation including a recovery token associated with the particular trusted entity and an encrypted confirmation code.

In Example 19, the subject matter of Example 18 can optionally include determining that a consensus status has been reached responsive to receiving a predetermined number of the recovery tokens from the one or more trusted entities; and sending the recovery token associated with each of the one or more trusted entities to the user device.

In Example 20, the subject matter of Example 19 can optionally include sending an indication of the consensus status to the user device.

In Example 21, the subject matter of Example 19 can optionally include resetting a new master password for the account responsive to determining that the consensus status has been reached.

In Example 22, the subject matter of Example 21 can optionally include wherein the new master password is reset using the received recovery tokens.

In Example 23, the subject matter of Example 22 can optionally include wherein the received recovery tokens are decrypted using an ephemeral private key and the encrypted confirmation code is used as a verification of the recovery token.

In Example 24, the subject matter of Example 23 can optionally include wherein the new master password is generated by the user device.

In Example 25, the subject matter of any of Examples 18-24 can optionally include wherein the system is further configured for receiving a designation of the one or more trusted entities from the user.

Example 26 is an apparatus for account recovery comprising: means for receiving a request for recovery of an account associated with a user; means for sending a CAPTCHA challenge to a user device associated with the user; means for receiving an answer to the CAPTCHA challenge and a confirmation code wrapped by an encryption key derived from a provisional master password; means for sending a notification of the request for recovery to one or more trusted entities associated with the user; and means for receiving a confirmation of the request from one or more of the trusted entities, the confirmation including a recovery token associated with the particular trusted entity and an encrypted confirmation code.

In Example 27, the subject matter of Example 26 can optionally include means for determining that a consensus status has been reached responsive to receiving a predetermined number of the recovery tokens from the one or more trusted entities; and means for sending the recovery token associated with each of the one or more trusted entities to the user device.

In Example 28, the subject matter of Example 27 can optionally include means for generating a new master password for the account responsive to determining that the consensus status has been reached.

Example 29 is an apparatus comprising means to perform a method as claimed in any preceding Examples.

Example 30 is Machine-readable storage including machine-readable instructions, when executed, to implement a method or realize an apparatus as described in any preceding Examples.

What is claimed is:

1. At least one non-transitory computer storage medium on which are stored instructions for allowing a user to regain access to credentials stored by a password manager, comprising instructions that when executed cause an authentication server to:
   receive a request for recovery of an account associated with a user;
   send a challenge to a user device associated with the user;
   receive an answer to the challenge and a confirmation code wrapped by an encryption key derived from a provisional master password;
   send a notification of the request for recovery to one or more devices associated with trusted entities authorized by the user;
   receive a confirmation of the request from one or more of the devices, the confirmation including a recovery token associated with the particular trusted entity and a keyed-hash message authentication code keyed with a confirmation code provided by the user device to the particular trusted entity;
   determine that a consensus status has been reached responsive to receiving a predetermined number of the recovery tokens from the one or more devices; and
   send the recovery token associated with each of the one or more devices to the user device,
   wherein the recovery tokens allow the user device to decrypt an account recovery block and re-encrypt the account recovery block with a key derived from the provisional master password, promoting the provisional master password to a master password for the account, and
   wherein the authentication server maintains no knowledge of the master password.

2. The at least one non-transitory computer storage medium of claim 1, wherein the instructions further comprise instructions that when executed cause the authentication server to send an indication of the consensus status to the user device.

3. The at least one non-transitory computer storage medium of claim 1, wherein the instructions further comprise instructions that when executed cause the authentication server to receive a designation of the one or more devices from the user.

4. An authentication server for allowing a user to regain access to credentials stored by a password manager, comprising:
   one or more processors; and
   a memory element coupled to the one or more processors, on which are stored instructions, comprising instructions that when executed cause the one or more processors to:
      receive a request for recovery of an account associated with a user;
      send a challenge to a user device associated with the user;
      receive an answer to the challenge and a confirmation code wrapped by an encryption key derived from a provisional master password;
      send a notification of the request for recovery to one or more devices associated with trusted entities authorized by the user;
      receive a confirmation of the request from one or more of the devices, the confirmation including a recovery token associated with the particular trusted entity and keyed-hash message authentication code keyed with a confirmation code provided by the user device to the particular trusted entity;
      determine that a consensus status has been reached responsive to receiving a predetermined number of the recovery tokens from the one or more devices; and
      send the recovery token associated with each of the one or more devices to the user device,
      wherein the recovery tokens allow the user device to decrypt an account recovery block and re-encrypt the account recovery block with a key derived from the provisional master password, promoting the provisional master password to a master password for the account, and
      wherein the authentication server maintains no knowledge of the master password.

5. The authentication server of claim 4, wherein the instructions further comprise instructions that when executed cause the one or more processors to send an indication of the consensus status to the user device.

6. The authentication server of claim 4, wherein the instructions further comprise instructions that when executed cause the one or more processors to receive a designation of the one or more devices from the user.

7. A computer-implemented method for allowing a user to regain access to credentials stored by a password manager, comprising:
   receiving, by an authentication server a request for recovery of an account associated with a user;
   sending a challenge from the authentication server to a user device associated with the user;
   receiving by the authentication server an answer to the challenge and a confirmation code wrapped by an encryption key derived from a provisional master password;
   sending by the authentication server a notification of the request for recovery to one or more devices associated with trusted entities authorized by the user;
   receiving by the authentication server a confirmation of the request from one or more of the devices, the confirmation including a recovery token associated with the particular trusted entity and a keyed-hash message authentication code keyed with a confirmation code provided by the user device to the particular trusted entity;
   determining by the authentication server that a consensus status has been reached responsive to receiving a predetermined number of the recovery tokens from the one or more devices; and
   sending by the authentication server the recovery token associated with each of the one or more devices to the user device,
   wherein the recovery tokens allow the user device to decrypt an account recovery block and re-encrypt the account recovery block with a key derived from the provisional master password, promoting the provisional master password to a master password for the account, and
   wherein the authentication server maintains no knowledge of the master password.

8. The computer-implemented method of claim 7, further comprising sending by the authentication server an indication of the consensus status to the user device.

9. The computer-implemented method of claim 7, further comprising receiving a designation of the one or more devices from the user.

10. At least one non-transitory computer storage medium on which are stored instructions for allowing a user to regain access to credentials stored by a password manager after loss of a master password, comprising instructions that when executed cause a user device to:
- receive from an authentication server a confirmation code associated with a trusted entity of a plurality of user authorized trusted entities;
- send the confirmation code to a device associated with the trusted entity with a request for the trusted entity to assist in recovery of access to the credentials;
- receive a plurality of recovery tokens from the authentication server, each associated with one of the plurality of user authorized trusted entities;
- receive from a user a provisional master password;
- combine the plurality of recovery tokens, producing a key encryption key;
- decrypt an account recovery block using the key encryption key;
- generate a new key encryption key from the provisional master password; and
- promote the provisional master password to the master password by reencrypting the account recovery block with the new key encryption key.

* * * * *